United States Patent Office 3,561,852
Patented Feb. 9, 1971

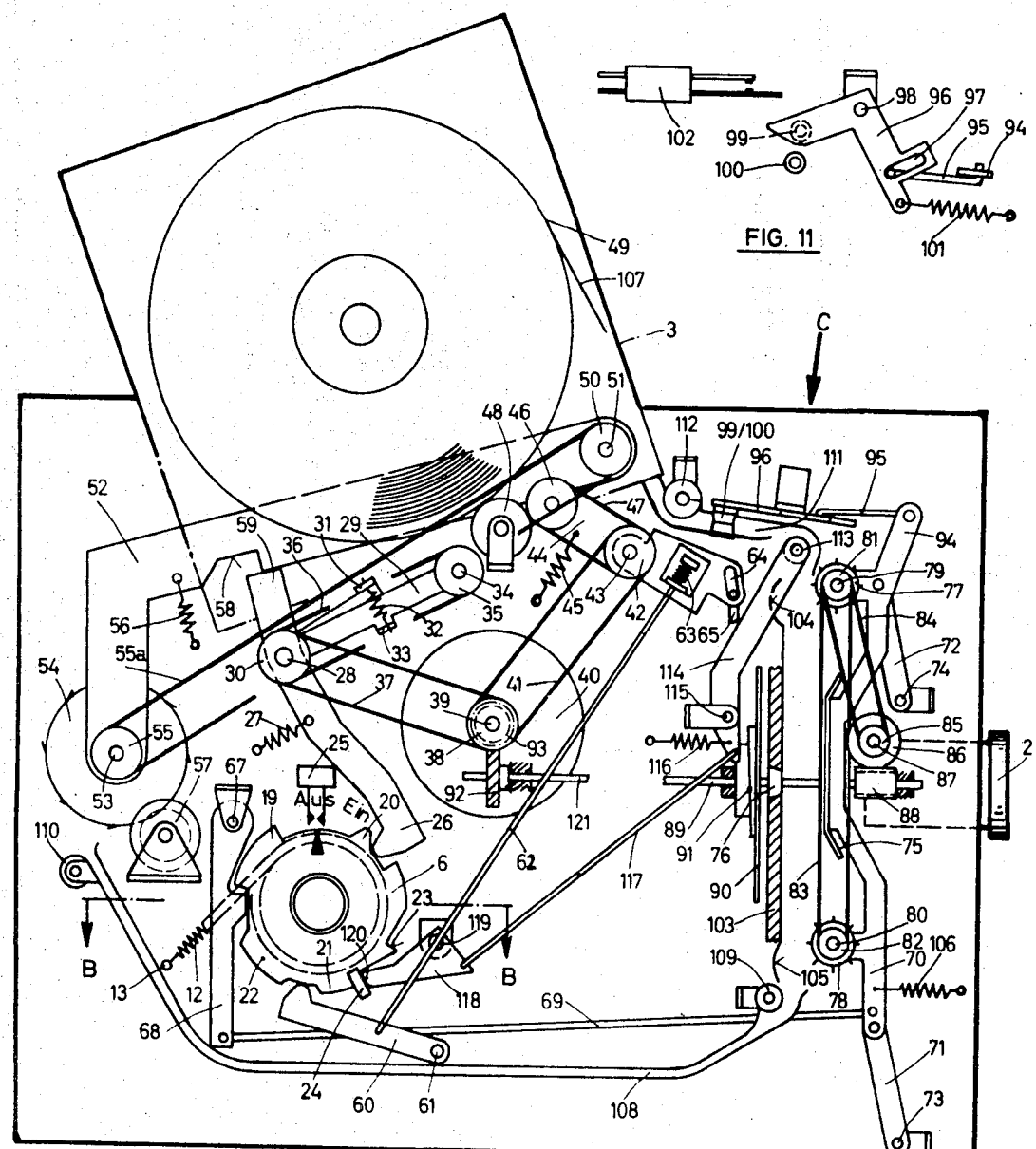

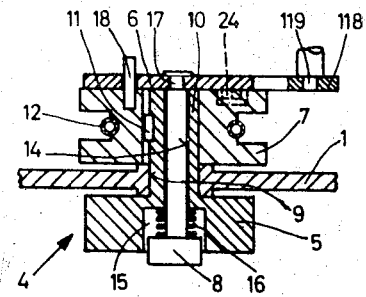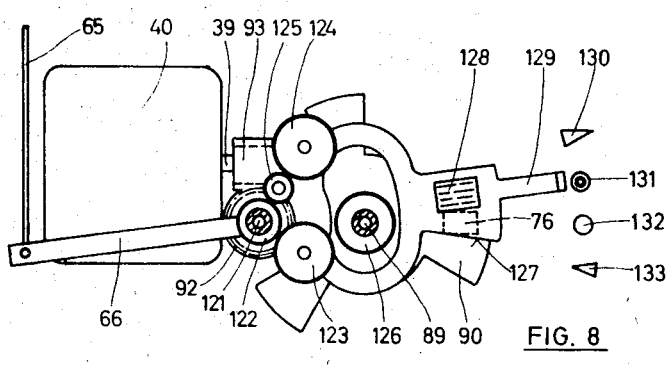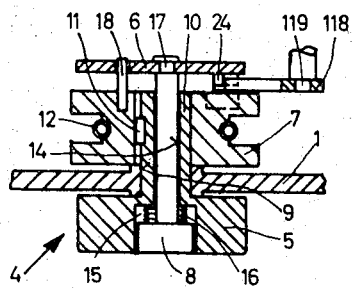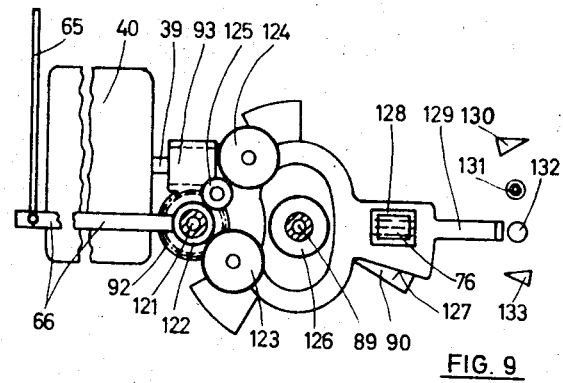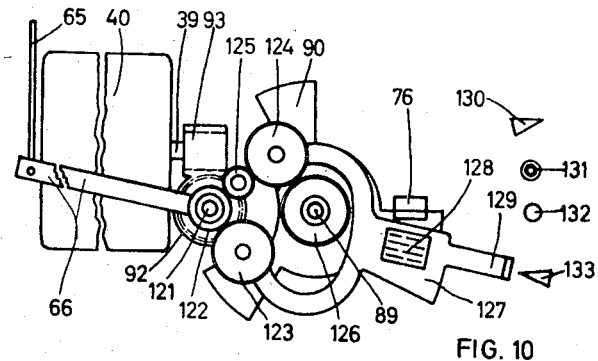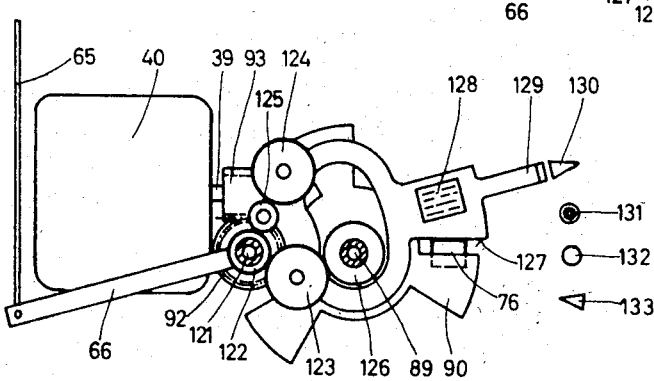

3,561,852
SWITCH APPARATUS FOR A FILM PROJECTOR
Fritz Krumbein and Dietrich Becker, Stuttgart-Mohringen, Germany, assignors to Zeiss Ikon Aktiengesellschaft, Stuttgart, Germany, a corporation of Germany
Filed June 27, 1968, Ser. No. 740,665
Claims priority, application Germany, July 1, 1967,
Z 12,925
Int. Cl. G03b 1/56
U.S. Cl. 352—157
7 Claims

ABSTRACT OF THE DISCLOSURE

A film projector, particularly one provided with a film cartridge insertable in the projector housing is equipped with a switch apparatus having a single central rotatable control member for controlling all of the operative functions of the projector, such as driving the film feed reel, the film take-up reel, controlling the drive motor, the film threading mechanism, the film advancing mechanism, the shutter mechanism and the forward and return movement of the film. This is accomplished by a cam disc having several cams mounted on the central rotable control member. Each cam controls a particular lever mechanism, each of which performs in the required sequence one particular operative function of the projector.

---

The invention relates to a switch apparatus for film projectors, particularly cartridge projectors.

Switch apparatuses of this kind usually comprise a plurality of operating controls, such as push buttons, or one push button and a rotatable knob for the control of all of the operating circuits and the mechanical switch members for threading, projecting and rewinding of the film, preferably with an open film guide in the vicinity of the picture window.

Such a multitude of controls which mostly are arranged at different places in the projector housing is detrimental to an efficient operation. The operator has to look constantly for the right controls and has to remember their placement at the various points of the projector housing as well as the succession in which these controls have to be operated to effect the different operative functions. In order to avoid mistakes which may lead to a film damage or to damages to the projector, there are frequently provided locking means which necessitate a predetermined sequence of operations.

Switch apparatuses of this kind fail to comply with the requirements for further simplification and automation of the operation of the projector.

The object of the invention is to obviate the existing shortcomings of film projectors of the above described type.

This is accomplished according to the invention by, first, providing a switch apparatus which includes a central operating member for the control of electrical and mechanical switching elements and which by means of these switching elements controls all of the projector circuits, the closing and opening of movable film guide parts, the switching of the drive from the film take-up reel to the film feed reel and reverse, and the movement of a drive member for the direct drive of the film winding on the film feed reel.

Secondly, the invention provides for a switch apparatus including a central operating member which is subject to a return spring and by means of a suitable structural element, a locking lever, a magnet or the like, is adapted to be locked against the action of this return spring in at least one switch position and to be released from this locked position by an electric impulse, whereby this impulse on reaching a predetermined projection phase, as for instance the end of the film, is generated in a manner known per se, so that the central switch returns automatically to its inoperative position.

According to another feature of the invention, the inoperative or rest position of the central operating member may be coordinated with the reverse position of the projector drive.

As an impulse transmitter for releasing the central operating member from its locked position, a switching lever which has a roller thereon and is controlled by the tension of the film, may be used.

According to the invention, the central operating member may operate a main electric switch for turning the supply circuit for the projector motor and the projection lamp on and off and may be provided with at least one control cam for the control of parts of the projector.

The main electric switch for closing the supply circuit of the projector motor may be connected in parallel with a second switch which remains closed even after the central operating member has returned to its operative position, so that when the main switch has been opened the second switch remains closed as long as the film has not yet been rewound.

This second switch may be closed by the central operating member and may be opened by the action of the film at the end of its rewinding. For this purpose, the second switch is disposed in the range of motion of a pivotal lever which on the one hand is connected with the central operating member and on the other hand carries a guide roller arranged opposite a sensing roller secured to the projector housing, whereby the film traveling between these two rollers is scanned by the sensing roller.

According to the invention, the control cam or cams of the central operating member may by way of gearings, linkages, levers, pulleys or the like, be connected with movable parts of the film guide, with drive rollers for the film feed and for reversing the direction of movement of the film and with a drive member which is insertable into the film cassette and serves to push the front end of the film out of the cassette.

In a further modification of the central operating member according to the invention, the drive member for pushing out the end of the film on the feed reel, may be retained in its operative position until its mission is fulfilled, i.e. until the film projects from the cassette all the way to the rewind reel.

For retaining the drive member in this position may serve a structural element, the position of which is controlled by the film during or at the end of the threading operation. This structural element may consist of a lever provided with a film rewind core which by the action of a directional force, such a spring, engages the outer circumference of a roller fixedly mounted within the projector housing, whereby the reel core without film is in contact with the smaller diameter of the stepped roller while with the first film winding on the reel core only a contact with the larger diameter of the stepped roller is possible due to the width of the film which is greater than the width of the reel core.

According to a still further feature of the invention the control cam or cams of the central operating member may be connected to a gearing for determining the direction of movement of the projector and its speed, whereby the projector motor may always run in the same rotational direction.

The aforementioned gearing for determining the direction of movement of the projector and its speed may also be adapted to be operable by a separate lever control, and the connection between this lever control and the gearing is brought about by a special coupling which permits an idle stroke.

The lever control according to the invention is adapted to be shifted into the operative positions "Forward Projection," "Still with Light," "Still Without Light," "Reverse Projection" and is constructed and mounted in such manner that it may be pivoted through the projection light beam and there act either as a filter or as a diaphragm. In other words, when this lever is in the position "Still With Light" and is pivoted into the projection light beam, it will act as a light-reducing filter, while in the position "Still Without Light" it will act as a diaphragm.

In the following, the invention will be described in further detail with reference to the accompanying drawings from which details not pertinent to the invention proper have been omitted for the purpose of making the other parts clearer.

In the drawings:

FIG. 1 illustrates the switch apparatus according to the invention in a film projector with an inserted cartridge in rest position in which the film is still completely within the cassette;

FIG. 2 illustrates the switch apparatus of FIG. 1 with all parts in threading position;

FIG. 5 illustrates the central operating member of the switch apparatus of FIG. 1 in section along the line B—B of FIG. 1;

FIG. 6 is a view similar to FIG. 5, but with the central operating member in a different operative position;

FIG. 7 illustrates that portion of the switch apparatus according to the invention which includes a supplementary switching lever, the latter being in the position "Forward Projection."

FIG. 8 is a view similar to FIG. 7 with the switching lever in the position "Still Without Light";

FIG. 9 is a similar view as FIG. 7 with the switching lever in the position "Still With Light";

FIG. 10 is a view similar to FIG. 7 with the switching lever in the position "Reverse Projection"; and FIGS. 11 and 12 illustrate two functional phases of these parts in a view in the direction of the arrow C shown in FIGS. 1 and 2.

Figures 2, 12:
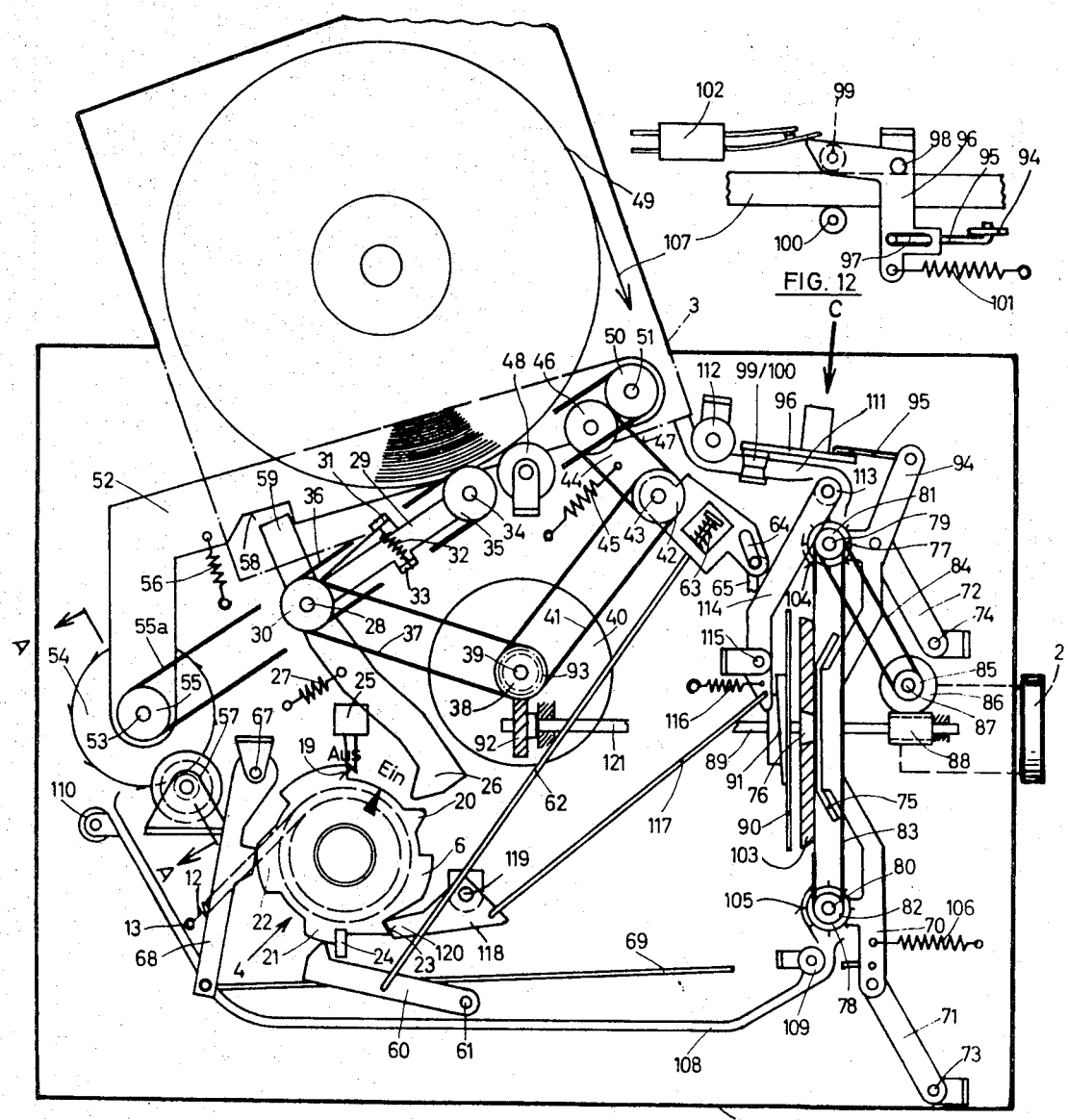

Referring to FIG. 1, a projector housing 1 is shown provided with an objective 2 and having a film cassette 3 inserted in a slot formed in the top wall of the housing. One of the side walls of the housing is removed so as to show the parts of the switch apparatus according to the invention arranged in the interior of the housing. Also the parts connected with the switching device are illustrated. A central operating member 4 is composed according to FIGS. 5 and 6 of a rotatable knob 5, a cam disc 6, a drum 7 and a return button 8 centrally arranged in the knob 5. The rotatable knob 5 extends with a tubular shaft 10 through an opening 9 in the projector housing wall. Inside the housing, the tubular shaft 10 has attached thereto a drum 7 which is fixedly secured to the tubular shaft 10 by a wedge 11. Wound upon the drum 7 is a helical spring 12, one end of which is secured to the drum 7. The other end of the spring 12 is so hooked to a pin 13 fixedly attached to the housing wall that the spring 12 always seeks to rotate the central switch 4 counterclockwise into its off or inoperative position.

The return button 8 has a shaft which is mounted in the bore 14 of the tubular shaft 10 and has an enlarged head arranged in a cavity 15 of the button 5. On the shaft of the return button 8 is deposited a pressure spring 16 which is received in the cavity 15 when the return button 8 is inserted into the rotatable knob 5. Then the cavity 15 is exteriorly filled out by the head of the return button 8. The inner end of the shaft of the return button 8 is reduced to form a pin 17 onto which the cam disc 6 is riveted. In that way, the drum 7 and the cam disc 6 are connected with each other and secured against rotation.

Figure 3:
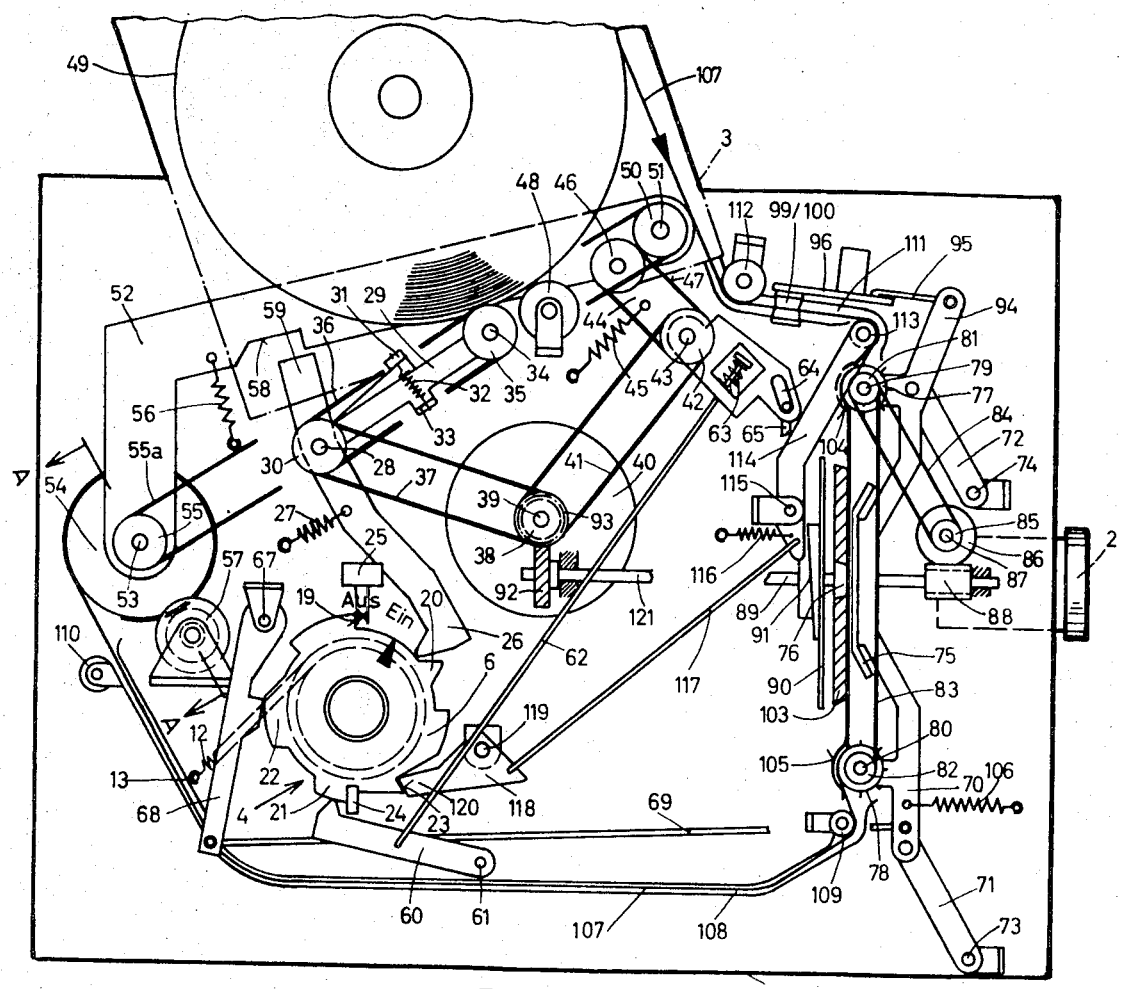
FIG. 3 illustrates the switch apparatus of FIG. 1 with the film threaded onto the take-up core.
Figure 4A:
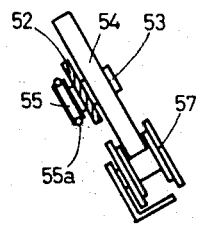
FIGS. 4a and 4b are a partial view along the line A—A of FIGS. 2 and 3.
Figure 4B:
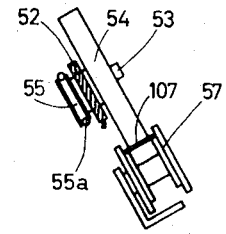

The cam disc 6 is provided with control cams 19 to 22, a locking tooth 23 and a locking tongue 245 (FIGS. 1 to 3). In the range of motion of the control cam 19 is disposed an electrical switch 25 for turning the motor and lamp circuit of the projector on and off.

The control cam 20 is engaged by an angular lever 26 acted upon by a spring 27. Attached to the stationary pivot shaft 28 of the angular lever 26 which is fixedly secured to the projector housing are also another lever 29 and a pair of rope pulleys 30 which are fixedly connected with each other. A tongue 31 on the angular lever 26 forms a stop for the lever 29, and at the same time serves as a hook for a spring 32, the other end of which is hooked into a tongue 33 of the lever 29. This spring 32 continues to urge the lever 29 into engagement with the tongue 31. To the free end of the lever 29 is attached a pin 34 for supporting a rope pulley 35 the rope groove of which is in alignment with one of the rope grooves of the rope pulley pair 30. Extending between the two rope grooves is an endless drive rope 36. From the second rope groove of the rope pulley pair 30 extends another drive rope 37 to a rope groove of a rope pulley pair 38 which are fixedly connected with one another and rigidly mounted on the shaft 39 of a drive motor 40. A drive belt 41 extends from the second belt groove of the pulley pair 38 to a pair of rope pulleys 42 mounted on a shaft 43 which is fixedly secured to the projector housing. The shaft 43 is at the same time also the pivot shaft for a lever 44 acted upon by a spring 45. This lever 44, in turn, carries a rope pulley 46 which connects a drive belt 47 with the second rope groove of the pulley pair 42. The lever 44 is pivotal between two terminal positions in one of which the drive belt 47 running over its pulley 46 is caused to engage a friction roller 48 whose pivot shaft is fixedly mounted with respect to the projector housing. The roller engages the outermost edge of a film reel 49 arranged in a film cassette 3. In the other one of the two terminal positions of the lever 44, the drive belt 47 guided over the pulley 46 engages a combination friction and rope pulley 50 (FIGS. 2 and 3) which is supported by a shaft 51 likewise fixedly secured to the projector housing.

On the same shaft 51 is mounted one end of a pivotal film-reel supporting arm 52 which on its other end carries a shaft 53 for supporting a film take-up core 54 and a rope pulley 55 which is connected in axial alignment and secured against rotation with the film take-up core 54. Guided over this rope pulley 55 and the friction pulley 50 is a drive belt 55a. The pivotal reel supporting arm 52 is acted upon by a spring 56 which with its other end is attached to the housing 1. This spring 56 urges the pivotal reel supporting arm 52 toward a stepped roller 57 located within the range of pivotal movement of the film take-up core 54. Consequently, because the film is wider than the film take-up core, the latter with no film winding thereon will engage the innermost step of the stepped roller 57, while it will engage the outermost step of the stepped roller 57 when it has a film wound thereon. The pivotal reel supporting arm 52 is further provided between its ends with a recess 58 which registers with a projection 59 of the angular level 26.

In the lower portion of the housing is arranged a lever 60 one end of which is pivotally supported by a shaft 61 while the other end has a nose in the vicinity of the locking cam 21 of the cam disc 6. The lever 60 is connected between its ends to the lever 44 by means of a rod 62 and a compensating spring 63. A slot 64 in the lever 44 is engaged by a rod 65 which is connected to a switching lever 66 (FIGS. 7 to 10) to be described later.

On a stationary shaft 67 near the upper left hand portion of the cam disc 6 is mounted another pivotal lever 68 for engaging the cam disc 6 in the vicinity of the control cam 22. The lower free end of the pivotal lever 68 is attached to one end of a rod 69 connected with its other end to a carrier body 70. This carrier body 70 is supported and displaced parallel by guide rods 71 and 72 which themselves are pivotal about stationary vertically spaced parallel axes 73 and 74. The carrier body 70 carries a film presser plate 75 which operative in the vicinity of the picture window 76, and vertically spaced film transport rollers 77 and 78 is arranged above and below the pressure plate 75 in the direction of movement of the film. The film transport roller 77 is supported on a shaft 79 which also supports a rope pulley pair 81, and the shaft 80 of the film transport roller 78 supports simultaneously a rope pulley 82. The rope pulley 82 and one of the two rope grooves of the pulley pair 81 are connected by a drive belt 83. In the second rope groove of the rope pulley pair 81 is placed a drive belt 84 which extends over a rope pulley 85 in axial alignment connected and secured against rotation with a gear wheel 86 and mounted on a stationary shaft 87. The gear wheel 86 cooperates with a worm 88, which in turn is attached to a horizontal shaft 89. The shaft 89 is mounted in the housing 1 and supports the rotary shutter 90 and the lifting and face cam 91. To this shaft 89 is transferred from a worm wheel 92 the motor drive by means of a gearing to be described later. The worm wheel 92 is in engagement with a worm 93 mounted on the shaft 39 of the drive motor 40. Hooked to an upwardly extending projection 94 of the carrier 70 is one end of a rod 95 which with its other end engages a slit 97 provided in one leg of a small angular lever 96 (FIG. 11). The angular lever 96 is pivotally mounted with its apexes on a stationary shaft 98, and carries at the end of its other leg a sensing roller 99 which in the vicinity of the film guide is arranged opposite a guide roller 100 disposed in the housing 1. Urged by a spring 101, the small angular lever 96 with its sensing roller 99 seeks to move toward the guide roller 100. Within the region of pivotal movement of the lever leg having the sensing roller 99 thereon is arranged an electrical switch 102 in such manner that it lies parallel to the switch 25 for the drive motor 40. The dimensions and arrangement of the angular lever 96 and the switch 102 are such that when the angular lever 96 is in a position where the distance between the sensing roller 99 and the guide roller 100 is equal to the width of the film, the switch 102 is closed. As the two rollers 99 and 100 approach each other, for instance when there is no longer any film between them, the switch 102 is also caused to open.

The film guide means 75, 77 and 78 arranged on the carrier 70 are disposed opposite the film guide path 103 and its curved ends 104 and 105. All these parts combine to form a common film guide near the picture window 76 when the carrier 70 is in the threading position or the projection position. If the film guide by the action of a spring 106 and due to the position of the cam disc 6 is opened, the film transport rollers 77 and 78 and the film transport gripper (not illustrated) are disengaged from the film which is designated by 107. The curved end 105 leads the film into a film guide 108 consisting of stationary guide bars which have placed at their inlet a roller 109 and at their outlet near the film take-up core 54 a roller 110, both rollers being mounted on shafts fixedly secured to the housing 1.

Extending from the upper curved end 104 is a film guide 111 likewise formed by fixed guide bars. It terminates at the opening of the film cassette and is provided at this end with a guide roller 112 mounted on a shaft securely attached to the housing 1. Thereafter the film guide 111 is interrupted to accommodate the sensing roller 99 and the guide roller 100. Between the upper curved ends 104 and the film guide 111, a second deflecting roller 113 engages the film strip. The deflecting roller 113 is mounted on the upper end of a pivotal lever 114 which is pivotal near its lower end about a stationary shaft 115. The lower end of the lever 114 extending beyond the pivot point is engaged by a spring 116 which seeks to move the upper end of the lever 114 with the roller 113 thereon toward the film 107. Hingedly attached to the same lower end of the lever 114 is one end of a rod 117 the other end of which engages a lock pawl 118 arranged near the central switch 4. The pawl 118 is pivotally mounted on a stationary shaft 119 and its locking tooth 120 cooperates with the locking tooth 23 and the locking tongue 24 of the cam disc 6.

The pivot points of the rod 117 are so selected that a movement of the deflecting roller 113 toward the film 107 (i.e. a swinging to the right of the lever 114) puts the pawl 118 in its locking position. Moving the lever 114 counter to the action of the spring 116, i.e. toward the left, effects a disengagement of the pawl 118.

The previously mentioned switching lever 66, which is connected to the lever 44 by means of the rod 65, is pivotally mounted on a stationary shaft 121 to which are also attached the aforementioned worm wheel 92 and a friction wheel 122. Three other friction wheels 123, 124 and 125 are attached to the switching lever 66 and the friction wheels 123 and 125 are in permanent frictional contact with the friction wheel 122 on the shaft 121. The friction wheel 124 is in permanent frictional contact with the friction wheel 125. Thus the friction wheel 125 acts as an intermediary wheel and the two friction wheels 123 and 124 rotate in opposite direction when the motor 40 is running. By pivoting the lever 66, the friction wheels 123 and 124 may be alternately put into frictional contact with a further friction wheel 126 disposed on the shaft 89 to which are also attached the rotary shutter 90 and the cam 91. The position of the switching lever 66 and its range of motion are so selected that it is capable of being pivoted through the projection light beam. For this reason it is built in the form of a covering diaphragm 127 and also as a holder for a filter 128. A handle 129 extending outwardly from the lever 66 and which extends outwardly from the housing 1 may be adjusted to four different operative positions as shown in FIGS. 7 to 10, where the mark 130 signifies "Forward Projection," the mark 131 signifies "Still Without Light," 132 signifies "Still With Light" and 133 means "Reverse Projection."

The switch apparatus according to the invention, operates as follows:

A film cassette or cartridge 3 is inserted into the receiving space provided on the projector which is connected to a source of current. The switch apparatus of the projector is in its position of rest. (FIG. 1.)

To get the projector started, the rotatable knob 5 as part of the central operating member 4 is turned clockwise into the position "Ein" (On).

FIG. 2 illustrates the switch apparatus shortly after it has been turned on. The cam disc 6 has been rotated clockwise and the locking pawl 118 by the action of the spring 116 has moved in front of the locking tooth 23. At the same time, the helical spring 12 on the drum 7 has been tensioned.

Thus, the mere motion of turning the projector on, controls a number of switch functions by way of the cam disc 6.

The control cam 19 has closed the electrical switch 25 for the motor of the lamp circuit. The control cam 20 has lifted the angular lever 26 until the pivotal reel supporting arm 52 has dropped with its recess 58 onto the projection 59 and the film take-up core 54 has moved onto the inner step of the stepped roller 57, thus maintaining the angular lever 26 in its lifted position. By means of the spring 32, the lever 29 was pivoted into the interior of the cassette 3 until the drive belt 36 on the pulley 35 was placed upon the film winding of the film feed reel 49 in the cassette 3. In this manner, the motor 40 by way of the drive belts 36 and 37 is readied to drive the film winding. The foremost end of the film 107 is pushed out of the cassette mouth and into the film guide 111.

The control cam 21 has pushed the lever 60 downwardly, and by means of the rod 62 and the stronger spring 63 has pivoted the lever 44 against the action of the weaker spring 45 until the drive belt 47 guided over the pulley 46 has engaged the friction pulley 50. Thereby the drive chain from the motor 40 over the drive belts 41, 47 and 55a to the film take-up core 54 has been closed. The film take-up core 54 is rotated in a take-up direction. Since the lever 66 remains in its position "Forward Projection," the slot 64 has moved over the bent-off end of the rod 65, projecting into the slot 64.

The control cam 22 has pushed the lever 68 outwardly and by way of the rod 69 the carrier 70 with the plate 75 and the film transport rollers 77 and 78 thereon has moved up to the stationary film guide plate 103 against the action of the spring 106 and into the curved ends 104 and 105, respectively. In so doing, the carrier 70 while approaching the fixed film guide path 103 by means of its tongue 94 and the rod 95 has pivoted the small angular lever 96 out of its inoperative position (FIG. 11) so that the sensing roller 99 moves out of the way of the film extending between it and the guide roller 100 (FIG. 12).

The film feed rollers 77 and 78 and the film gripper not illustrated, are driven by the motor 40 by means of the worm wheel 92, shaft 121, friction wheel gearing 122, shaft 89 and the cam 91, and via worm 88, worm wheel 86, pulley 85 and drive belts 83 and 84, respectively.

Thus the film feeding path from the cassette 3 to the film take-up core 54 is completed and ready to receive the film 107 which by means of the drive belt 36 on the pulley 35 is moved outwardly of the cassette 3.

FIG. 3 illustrates the switch apparatus according to the invention, after the film 107 has been completely threaded onto the film take-up core 54. The first winding of the film 107 has been wound upon the core 54. During the advancement of the film 107 between the core 54 and the stepped roller 57, it has lifted the film take-up core 54 from the inner step of the stepped roller 57 onto the outer step thereof. By the simultaneous pivotal movement of the reel-supporting arm 52, the angular lever 26 has been released from the recess 58. It dropped back into its initial position by the action of the spring 27 and by way of the tongue 31 took along the lever 29. As a result, the drive connection between the drive belt 36 and the film winding on the film feed reel 49 in the cassette 3 is interrupted. The film may now run until it has reached its end.

When the end of the film is reached, the length of film between the film end attached to the core of the film feed reel 49 and the film transport roller or sprocket 77 is tensioned. During this tensioning of the film 107, the lever 114 with its guide roller 113 is moved against the action of its spring 116 and thereby disengages by way of the rod 117 the locking pawl 118 from the locking tooth 23 of the cam disc 6. The cam disc 6 thus released, springs back into its initial position under the action of its helical spring 12. This has the result that all switching elements with the exception of the angular lever 96 return to the position illustrated in FIG. 1. Even though the electric switch 25 of the motor 40 is opened during this operation, it nevertheless keeps operating because the motor supply circuit remains closed by way of the electric switch 102. Due to the return of the carrier 70 into its position of rest, the film transport rollers 77 and 78 and the film gripper are disengaged from the film 107. The drive belt 47 on the pulley 46 now engages the friction wheel 48, which engages the outer circumference of one of the flanges of the film feed reel 49, and moves the film feed reel 49 backward. Since at the same time, the drive of the film take-up core 54 is interrupted, the film 107 can now be rewound easily. When the start of the film which has now become its end has passed the sensing roller 99 and the guide roller 100, the angular lever 96 is also pivoted into its position of rest. The electric switch 102 is opened and the supply circuit for the motor 40 is opened. The kinetic energy of the moving parts is sufficient to pull the end of the film into the cassette or cartridge 3 which end of the film at the moment the motor is turned off, is still projecting from it. It is also possible to install an electric delay switch for the motor 40 so as to make sure that the film end is completely pulled into the cassette 3.

If the projection is to be interrupted before the end of the film is reached, the reverse button 8 is axially pushed into the rotary knob 5. (FIGS. 5 and 6). This causes the cam disc 6 with its locking tooth 23 to be moved axially and away from the range of the locking pawl 118. The cam disc 6 springs back by the action of its helical spring 12 until the locking tongue 24 engages the locking pawl 118. The result is the same as when the film end is reached. The film during the opened film path in the range of the picture window is wound back into the cassette.

The control lever 66 is provided for a selective projection of the film. When this control lever 66 is operated and shifted from its normal position "Forward Projection" (FIG. 7) into the position "Still without Light" (FIG. 8), the opaque portion 127 of the lever 66 is moved into the projection light beam, so that no projection light will be emitted to the outside. At the same time, the friction wheel 123 is lifted from the friction wheel 126. The rotary shutter 90, the film gripper and the film transport drums 77 and 78 are at rest.

When the control lever 66 is moved to the position "Still with Light" (FIG. 9), the drive via the friction wheel gearing remains likewise interrupted. However, the projection light now passes through a filter 128. This filter 128 protects the film frame standing in the picture window 76 from possible heat damage during the still projection.

When the control lever 66 has been moved to the position "Reverse Projection," the friction wheel 126 is operated by way of the friction wheels 122, 124 and 126. The control lever 66 is moved out of the picture window 76 and the film transport is reversed.

While for the operative positions interrupting the film movement (FIGS. 8 and 9), the drive belt 47 on the pulley 46 merely was disengaged by means of the rod 65 from the friction pulley 50, in the "Reverse" position the drive belt 47 engages the friction wheel 48 and winds the film back into the cassette 3 in the same manner as described above. The necessary movement of the lever 44 is provided for by the balance spring 63 arranged between the rod 62 and the lever 44, although the lever 60 with its rod 62 remains in its forward position (FIGS. 2 and 3).

What we claim is:

1. An apparatus for controlling the operation of a film projector provided with a film cartridge containing a film feed reel with a film spool thereon, said apparatus including a rotatable central operating member (4) operatively connected with an axially aligned cam disc (6) having a plurality of cams (19 to 22) thereon, a first electrical switch (25) controlled by one (19) of said cams for closing and opening the electric circuit for the projector motor and circuit of the projection lamp; pivotally mounted levers (26, 60, 68) actuated by the other ones of said cams, said levers controlling a film conveying means, said film feed reel, a film take-up reel, and film reversing means, respectively; and including also a drive means (29, 35, 36) for directly driving the film on said film feed reel in said film cartridge, said drive means being adapted to be pivotally moved into said film cartridge to engage the spool therein; and a second electric switch (102) arranged in parallel to said first electric switch (25), said second electric switch remaining closed after said central operating member has returned to its starting position and said first electric switch has opened, as long as the film has not as yet been rewound.

2. An apparatus according to claim 1, in which said central control member is provided with a reverse movement button (8) which is connected to a locking cam means (23, 118) operatively connected with said central control member in such manner, that said central control member is releasable to return to its starting position at any time.

3. An apparatus according to claim 1, in which said central control member is provided with a reverse movement button (8) which is connected to a locking cam means (23, 118) operatively connected with said central control member in such manner, that said central control member is releasable to return to its starting posiiton at any time, said reverse movement button (8) is axially displaceably arranged in a center bore (14) of said central control member and is connected with a control cam (6) associated with said central control member in such manner, that by an axial movement of said reverse button (8), said control cam is disengaged from a locking lever (118).

4. An apparatus according to claim 1, in which said control cam (6) which is arranged in axial alignment with said central operating member is connected by means of gearings, linkages, levers, pulleys and endless ropes with drive rollers (77, 78) disposed adjacent the film guide (70) for the film advancement and for reversing the direction of movement of said film, and is also connected with said drive means (29, 35, 36) which is movable into said film cartridge and serves to push the front end of the film out of said cassette, said drive means being retained in its operative position by a film reel supporting arm (52) during the threading of the film until the film projects from the interior of said cartridge, said film reel supporting arm carrying a film take-up core (54) which by the action of a spring (56) engages the outer circumference of a stepped roller (57) fixedly mounted in the projector housing, whereby said film take-up core (54) without film (107) thereon is in contact with the smaller diameter of said stepped roller, while with the first film winding on said core (54) solely a contact with the larger diameter of said stepped roller is possible.

5. An apparatus according to claim 1, in which said control cam (6) which is arranged in axial alignment with said central operating member is operatively connected with a gearing for determining the direction of movement of said projector, said gearing being manually controlled by a separate lever (66) which carries two friction wheels (123, 124), the first of which (123) is in permanent frictional contact with a motor-driven friction wheel (122) mounted on a shaft (121), on which said lever is pivotally mounted, while the second friction wheel (124) is in permanent frictional contact with an intermediate friction wheel (125), likewise mounted on said lever (66), and by means of said intermediate wheel is also in contact with said friction wheel (122) mounted on said pivot shaft of said lever, said two friction wheels being adapted to be alternately brought into frictional contact with a friction wheel (126) arranged on the shutter shaft (80) of said projector.

6. An apparatus according to claim 1, in which said second switch (102) is closed by said central operating member and is opened by the action of the film upon completion of its reverse movement.

7. An apparatus according to claim 1, in which said second switch (102) is disposed in the range of motion of a pivotal lever (96) which at one end is operatively connected with said central operating member and on its other end carries a sensing roller (99) disposed opposite to a stationary guide roller (100), said sensing roller engaging said film (107) disposed between said two rollers in its entire width.

References Cited
UNITED STATES PATENTS

| | | | |
|---|---|---|---|
| 2,136,322 | 11/1938 | Sebastiani | 352—149 |
| 2,343,850 | 3/1944 | Fairbanks et al. | 352—124X |
| 2,437,252 | 3/1948 | Gould | 352—124 |
| 2,907,532 | 10/1959 | Briskin et al. | 352—124X |
| 3,337,146 | 8/1967 | Miyauchi et al. | 352—157X |
| 3,460,889 | 8/1969 | Wilharm | 352—124 |

FOREIGN PATENTS

| | | | |
|---|---|---|---|
| 913,829 | 12/1962 | Great Britain | 352—178 |

JOHN M. HORAN, Primary Examiner

M. D. HARRIS, Assistant Examiner

U.S. Cl. X.R.

242—192, 199; 352—166